(12) United States Patent
Tsunoda

(10) Patent No.: US 12,487,414 B2
(45) Date of Patent: Dec. 2, 2025

(54) OPTICAL CONNECTOR AND OPTICAL CONNECTOR MODULE

(71) Applicant: KYOCERA CORPORATION, Kyoto (JP)

(72) Inventor: Masatoshi Tsunoda, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 355 days.

(21) Appl. No.: 18/016,214

(22) PCT Filed: Jul. 6, 2021

(86) PCT No.: PCT/JP2021/025518
§ 371 (c)(1),
(2) Date: Jan. 13, 2023

(87) PCT Pub. No.: WO2022/014419
PCT Pub. Date: Jan. 20, 2022

(65) Prior Publication Data
US 2023/0280555 A1    Sep. 7, 2023

(30) Foreign Application Priority Data

Jul. 17, 2020 (JP) .................................. 2020-123188

(51) Int. Cl.
*G02B 6/38* (2006.01)
*G02B 6/30* (2006.01)
(Continued)

(52) U.S. Cl.
CPC ............. *G02B 6/3897* (2013.01); *G02B 6/30* (2013.01); *G02B 6/36* (2013.01); *G02B 6/4292* (2013.01)

(58) Field of Classification Search
CPC ...... G02B 6/30; G02B 6/3897; G02B 6/4292; G02B 6/36
See application file for complete search history.

(56) References Cited

U.S. PATENT DOCUMENTS 9,182,551 B2    11/2015   Oyagi
9,645,318 B2     5/2017   Moriyama
(Continued)

FOREIGN PATENT DOCUMENTS

CN    110741295 A    1/2020
JP    H03134603 A    6/1991
(Continued)

*Primary Examiner* — Michael P Mooney
(74) *Attorney, Agent, or Firm* — Duane Morris LLP

(57) ABSTRACT

An optical connector (20) according to the present disclosure is an optical connector (20) attached to an optical transmission line (10), which includes a base body (11) and an optical waveguide (12) stacked on the base body (11). The optical connector (20) includes a first base (21) placed on the optical transmission line (10), a contact portion (213) included in the first base (21) and being in contact with a placement surface of the optical transmission line (10), and a bonding portion (214) formed in a region of the first base (21) in which the contact portion (213) is not formed and being spaced apart from a surface of the optical transmission line (10). A space (S2) is formed between the bonding portion (214) and the surface of the optical transmission line (10), and an agent (A) attaching the optical connector (20) to the optical transmission line (10) is provided in the space (S2).

18 Claims, 6 Drawing Sheets

(51) Int. Cl.
*G02B 6/36* (2006.01)
*G02B 6/42* (2006.01)

(56) References Cited

U.S. PATENT DOCUMENTS

| | | | |
|---|---|---|---|
| 11,143,820 B2 | 10/2021 | Tsunoda et al. | |
| 2015/0010273 A1* | 1/2015 | Oyagi | G02B 6/4284 |
| | | | 385/33 |
| 2020/0103596 A1* | 4/2020 | Tsunoda | G02B 6/32 |

FOREIGN PATENT DOCUMENTS

| | | |
|---|---|---|
| JP | H05323154 A | 12/1993 |
| JP | 2000019343 A | 1/2000 |
| JP | 2007110594 A | 4/2007 |
| JP | 2013171112 A | 9/2013 |
| JP | 2013200550 A | 10/2013 |
| JP | 2016009081 A | 1/2016 |
| JP | 2017204541 A | 11/2017 |
| WO | 2018229992 A1 | 12/2018 |

* cited by examiner

OPTICAL CONNECTOR AND OPTICAL CONNECTOR MODULE

CROSS-REFERENCE TO RELATED APPLICATIONS

The present application claims the priority of Japanese Patent Application No. 2020-123188 filed on Jul. 17, 2020, the disclosure of which is hereby incorporated by reference in its entirety.

TECHNICAL FIELD

The present disclosure relates to an optical connector and an optical connector module.

BACKGROUND OF INVENTION

A known optical connector optically couples optical transmission lines. For example, Patent Literature 1 discloses that a lens member is provided in order to reduce a coupling loss between an optical fiber and an optical waveguide.

CITATION LIST

Patent Literature

Patent Literature 1: Japanese Unexamined Patent Application Publication No. 2016-009081

SUMMARY

In an aspect of the present disclosure, an optical connector is an optical connector attached to an optical transmission line including a base body and an optical waveguide stacked on the base body. The optical connector includes a first base, a contact portion, and a bonding portion. The first base is placed on the optical transmission line. The contact portion is included in the first base and is in contact with a placement surface of the optical transmission line. The bonding portion is formed in a region of the first base that is different from another region of the first base in which the contact portion is formed, and the bonding portion is spaced apart from a front surface of the optical transmission line. A space is formed between the bonding portion and the front surface of the optical transmission line, and an agent attaching the optical connector to the optical transmission line is provided in the space.

In another aspect of the present disclosure, an optical connector module includes the above-described optical connector, the optical transmission line including the base body and the optical waveguide portion stacked on the base body, and the agent attaching the optical connector to the optical transmission line.

DESCRIPTION OF EMBODIMENTS

Figure 1:
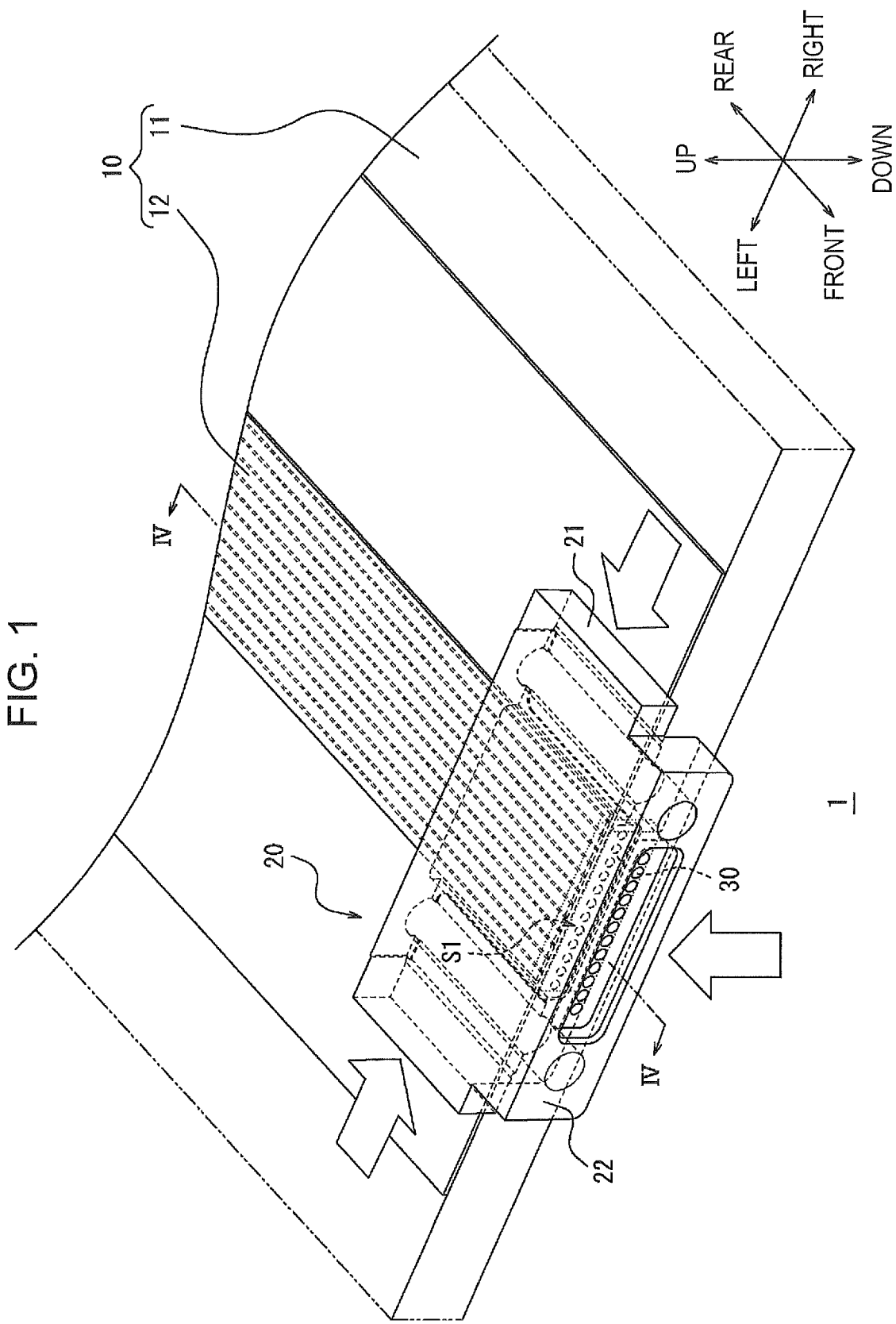
FIG. 1 is an external perspective view of an optical connector module including an optical connector according to an embodiment when viewed from a top surface of the optical connector module.

When an optical connector is attached to an optical transmission line, as an example, a mounting method including multiple steps is employed. Such a mounting method includes, for example, a positioning step of positioning an optical connector with respect to an optical transmission line and a fixing step of fixing the optical connector to the optical transmission line by injecting an adhesive that has an adhesive function and a refractive-index adjustment function into a space between the optical connector and the optical transmission line.

In the fixing step, however, depending on the surface tension and the amount of the adhesive, there is a possibility that the adhesive may flow into a space between the optical connector and the optical transmission line, the space being originally designed such that the adhesive does not flow into the space. This may cause the position of the optical connector with respect to the optical transmission line to be displaced from the originally designed position of the optical connector, and there is a possibility that the optical connector attached to the optical transmission line will not have a desired optical property.

According to an embodiment of the present disclosure, an optical connector and an optical connector module are capable of reducing displacement of the optical connector with respect to an optical transmission line and maintaining a desired optical property.

An embodiment of the present disclosure will be described in detail below with reference to the accompanying drawings. In the following description, a longitudinal direction, a transverse direction, and the vertical direction correspond to the directions indicated by arrows in the drawings. FIG. 1 to FIG. 8 use the same directions of arrows.

FIG. 1 is an external perspective view of an optical connector module 1 including an optical connector 20 according to an embodiment when viewed from a top surface of the optical connector module 1. A configuration and a function of the optical connector module 1 will now be schematically described with reference to FIG. 1.

The optical connector module 1 includes an optical transmission line 10, the optical connector 20 optically coupled to the optical transmission line 10, and an adhesive 30 that adjusts the refractive index of a first space S1 that is formed between the optical transmission line 10 and the optical connector 20. The optical connector module 1 include an agent A (described later) attaching the optical connector 20 to the optical transmission line 10.

The optical connector 20 is attached to the optical transmission line 10 by a mounting method including multiple steps. The mounting method includes, for example, a first step of positioning the optical connector 20 in a state where the optical connector 20 is placed on the optical transmission line 10.

The mounting method includes, for example, a second step of applying an agent between the optical connector 20 and the optical transmission line 10 from the left and right sides of the optical connector 20, which has been positioned in the first step, as indicated by arrows extending along the transverse direction in FIG. 1. The second step is a step of fixing the optical connector 20 to the optical transmission line 10 by using such an agent. In the present specification, the term "agent" includes, for example, any filler that has an adhesive function. For example, the agent includes an adhesive.

The mounting method includes, for example, a third step of injecting the adhesive 30 into the first space S1 formed between the optical transmission line 10 and the optical connector 20 from below the optical connector 20, which has been fixed to the optical transmission line 10 in the second step, as indicated by an arrow extending in the upward direction in FIG. 1. The adhesive 30 has an adhesive function for fixing the optical connector 20 to the optical transmission line 10 and a function of adjusting the refractive index in the first space S1. The third step is a step of fixing the optical connector 20 to the optical transmission line 10 by using the adhesive 30.

The optical connector module 1 is optically coupled to other optical transmission lines such as, for example, an optical fiber and an optical waveguide. For example, the optical connector 20 attached to the optical transmission line 10 in the optical connector module 1 is connected to a ferrule holding an optical fiber, so that the optical transmission line 10 and the optical fiber can be optically coupled to each other. For example, the optical connector 20 attached to the optical transmission line 10 in the optical connector module 1 is connected to another optical connector attached to an optical waveguide like the optical connector 20, so that the optical transmission line 10 and the optical waveguide can be optically coupled to each other.

Figure 2:
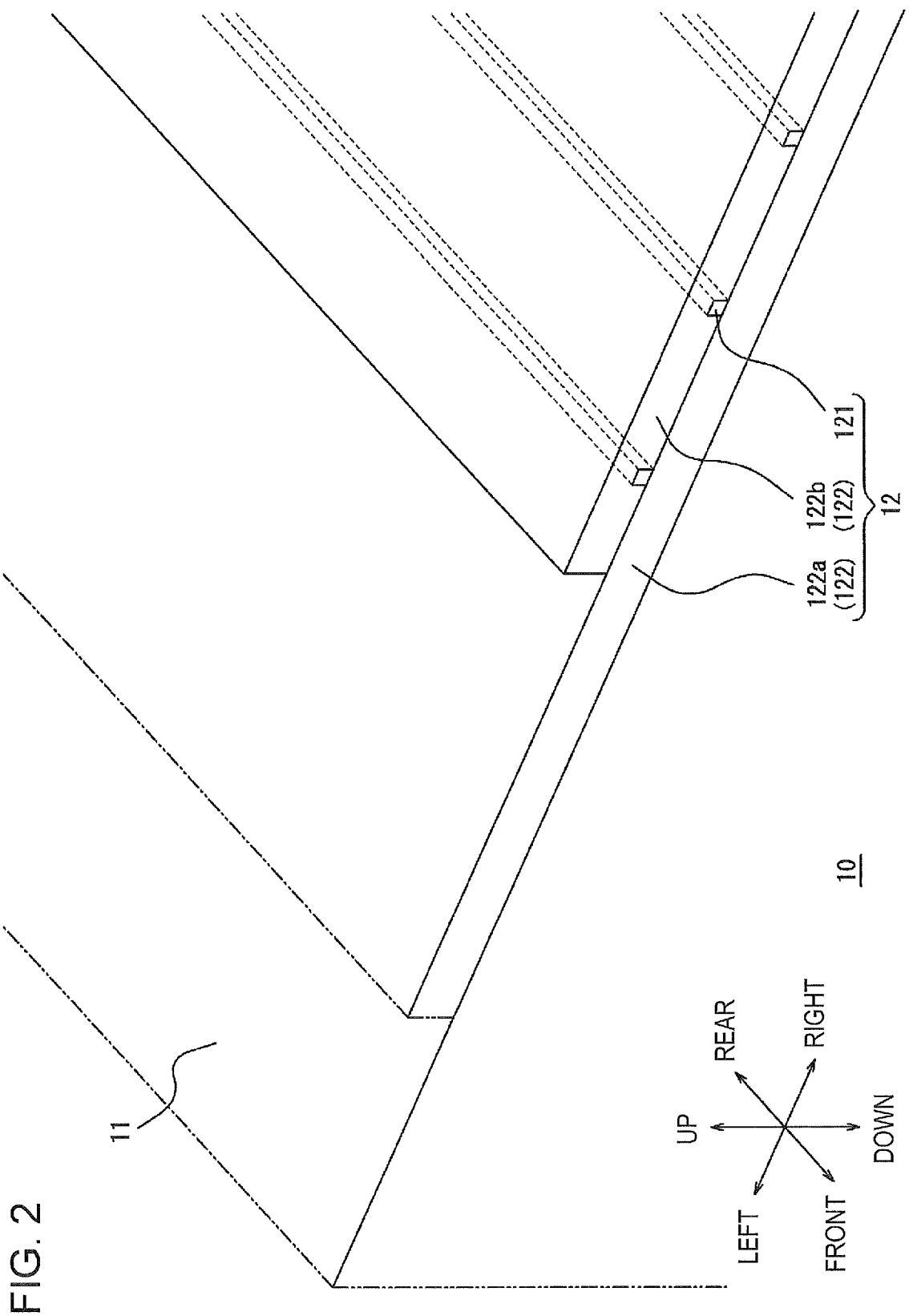
FIG. 2 is an external perspective view in which an optical transmission line illustrated in FIG. 1 is solely illustrated in an enlarged manner as viewed from the top surface.

FIG. 2 is an external perspective view in which the optical transmission line 10 illustrated in FIG. 1 is solely illustrated in an enlarged manner as viewed from the top surface. The configuration of the optical transmission line 10 will now be mainly described with reference to FIG. 2. In the embodiment, the optical transmission line 10 includes a base body 11 and an optical waveguide 12 stacked on the base body 11.

For example, the optical transmission line 10 includes the base body 11 made of a rigid printed wiring board and the optical waveguide 12 stacked on the top surface of the base body 11. The optical waveguide 12 is formed so as to have, for example, a protruding shape protruding upward from the top surface of the base body 11. The optical waveguide 12 is formed so as to have, for example, an end surface that is flush with an end surface of the base body 11 in order to be optically coupled to the optical connector 20. The end surface of the optical waveguide 12 is, for example, a flat surface extending along the end surface of the base body 11. The waveguide mode of the optical waveguide 12 may be either a single mode or a multi-mode.

The optical waveguide 12 includes multiple cores 121 each of which is stacked on the base body 11 in a stacking direction perpendicular to the base body 11 and a cladding 122 stacked on the base body 11 in the stacking direction. More specifically, the optical waveguide 12 includes a first cladding 122a stacked on the top surface of the base body 11, the cores 121 each of which is stacked on the first cladding 122a, and a second cladding 122b surrounding the cores 121 by sandwiching the cores 121 together with the first cladding 122a in the stacking direction.

The multiple cores 121 are formed in such a manner as to be spaced apart from one another at a predetermined pitch in the transverse direction. Each of the cores 121 extends in the longitudinal direction. The cores 121 and the cladding 122 are each made of a suitable material such as, for example, quartz-based glass. The refractive index of each of the cores 121 is higher than the refractive index of the cladding 122. Although the optical waveguide 12 will hereinafter be described as, for example, an embedded optical waveguide, the optical waveguide 12 is not limited to an embedded optical waveguide. The optical waveguide 12 may be any suitable type of optical waveguide, examples of which are a slab optical waveguide, a semi-embedded optical waveguide, and the like.

The optical transmission line 10 is manufactured by using, for example, photolithography. A step of manufacturing the first cladding 122a, a step of manufacturing the cores 121, and a step of manufacturing the second cladding 122b are performed in this order. A method of manufacturing the optical transmission line 10 includes a step of stacking the first cladding 122a, which is included in the optical waveguide 12, onto the base body 11 in the stacking direction, which is perpendicular to the base body 11. The method of manufacturing the optical transmission line 10 further includes a subsequent step of stacking each of the cores 121, which are included in the optical waveguide 12, onto the first cladding 122a. The method of manufacturing the optical transmission line 10 further includes a subsequent step of stacking the second cladding 122b, which is included in the optical waveguide 12, in such a manner that the cores 121 are sandwiched between the second cladding 122b and the first cladding 122a in the stacking direction.

Figure 3:
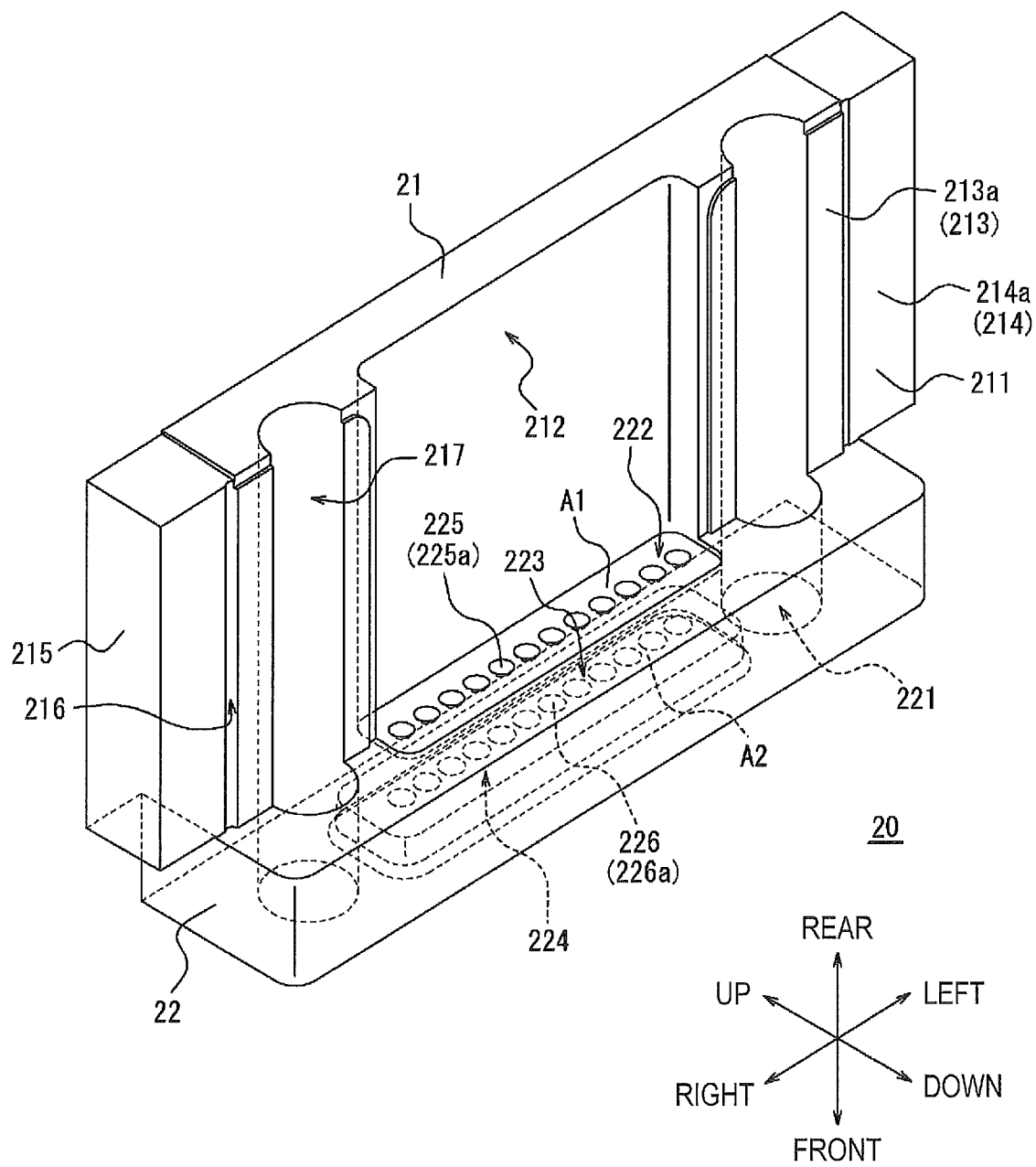
FIG. 3 is an external perspective view in which the optical connector illustrated in FIG. 1 is solely illustrated.

FIG. 3 is an external perspective view in which the optical connector 20 illustrated in FIG. 1 is solely illustrated. An example of the configuration of the optical connector 20 illustrated in FIG. 1 will be mainly described with reference to FIG. 3.

The optical connector 20 is made of, for example, a translucent resin material and has an L-shape. For example, the optical connector 20 is made of a material having a refractive index that approximates the refractive index of each of the cores 121 of the optical waveguide 12.

The optical connector 20 includes a first base 21 extending in the longitudinal direction. The optical connector 20 includes a recess 212 formed at the center of a bottom surface 211 of the first base 21 in the transverse direction so as to be more recessed than the bottom surface 211 toward the upper side of the first base 21, that is, toward the inner side of the first base 21.

The optical connector 20 includes contact portions 213 each projecting toward the outside of the first base 21 in the vertical direction further than the bottom surface 211. One of the contact portions 213 is positioned on the left side of the recess 212, and the other contact portion 213 is positioned on the right side of the recess 212. Each of the contact portions 213 includes a lowermost portion of the first base 21 in the downward direction, that is, a contact surface 213a located at an end of the first base 21. Each of the contact surfaces 213a is formed at the most protruding position in the first base 21 toward the optical transmission line 10. Each of the contact surfaces 213a forms a lower end surface of the first base 21. The contact portions 213 and the contact surfaces 213a extend over substantially the entire first base 21 in the longitudinal direction.

The optical connector 20 includes first bonding portions 214. In the first base 21, the first bonding portions 214 are formed in regions in which the contact portions 213 are not formed. The first bonding portions 214 each include a portion of the bottom surface 211 of the first base 21. Each of the first bonding portions 214 is located outside a corresponding one of the contact portions 213 in the transverse direction. One of the first bonding portions 214 is positioned on the left side of the recess 212, and the other first bonding portions 214 is positioned on the right side of the recess 212. The first bonding portions 214 each include a bonding surface 214a located above a corresponding one of the contact surfaces 213a, that is, located further toward the inner side of the first base 21 than the contact surface 213a. In the first base 21, the bonding surfaces 214a are located on the side opposite to the side on which the optical transmission line 10 is disposed with respect to the contact surfaces 213a. In the first base 21, the area of each of the bonding surfaces 214a is larger than the area of the corresponding contact surface 213a. The first bonding portions 214 and the bonding surfaces 214a extend over the entire first base 21 in the longitudinal direction.

The optical connector 20 includes side walls 215 forming side end portions of the first base 21. One of the side walls 215 is positioned on the left side of the recess 212, and the other side wall 215 is positioned on the right side of the recess 212. Each of the first bonding portions 214 is included in a corresponding one of the side walls 215. The bonding surfaces 214a of the first bonding portions 214 form the bottom surfaces of the side walls 215, that is, portions of the bottom surface 211. The side walls 215 project toward opposite sides in the transverse direction such that one of the side walls 215 is located on the left side of a second base 22 (described later) and that the other side wall 215 is located on the right side of the second base 22. The side walls 215 extend, at the side end portions of the first base 21, over the entire first base 21 in the longitudinal direction.

The optical connector 20 includes relief concave portions 216 each of which is formed in the first base 21 so as to separate one of the contact portions 213 and the corresponding first bonding portion 214 from each other. The relief concave portions 216 are each formed so as to have, for example, a groove shape so as to serve as a relief groove. Each of the relief concave portions 216 is sandwiched between one of the contact portions 213 and the corresponding first bonding portion 214. One of the relief concave portions 216 is positioned on the left side of the recess 212, and the other the relief concave portion 216 is positioned on the right side of the recess 212. The relief concave portions 216 extend over the entire first base 21 in the longitudinal direction.

The optical connector 20 includes positioning portions 217 each of which is formed in a recessed manner in the first base 21 such that each of the contact portions 213 is sandwiched by one of the positioning portions 217 and a corresponding one of the side walls 215. From another standpoint, each of the positioning portions 217 is recessed in a center portion of the corresponding contact portion 213. One of the positioning portions 217 is positioned on the left side of the recess 212, and the other positioning portion 217 is positioned on the right side of the recess 212. The positioning portions 217 extend over the entire first base 21 in the longitudinal direction. The positioning portions 217 are formed so as to be continuous with through holes 221 of the second base 22 (described below) and to extend to the rear end of the first base 21. The positioning portions 217 are each a concave portion formed so as to have a semicircular shape when viewed in cross section. Each of the positioning portions 217 is formed concentrically with one of the through holes 221.

The optical connector 20 has an L-shape and includes the second base 22 projecting from the first base 21 in a direction perpendicular to the direction in which the first base 21 extends. The second base 22 is formed in such a manner as to project further toward the front side than the first base 21 and to be contiguous to the first base 21. The second base 22 is formed in such a manner as to project downward from the first base 21.

The through holes 221 are each formed in the optical connector 20 so as to extend between the front surface to the rear surface of the second base 22 and to have a circular shape when viewed in cross section. One of the through holes 221 is formed in a left end portion of the second base 22 so as to correspond to one of the positioning portions 217 of the first base 21, and the other through hole 221 is formed in a right end portion of the second base 22 so as to correspond to the other positioning portion 217 of the first base 21. One of the through holes 221 is positioned on the left side of the recess 212 of the first base 21, and the other through hole 221 is positioned on the right side of the recess 212.

The optical connector 20 includes a first cutout portion 222 formed by cutting out an inner surface of the second base 22 so as to reach a first side surface A1. The first cutout portion 222 has a recessed shape. The optical connector 20 includes a second bonding portion 223 defined by four side surfaces, which are the top, bottom, left, and right surfaces defining the first cutout portion 222, the first side surface A1, and an inner surface of the second base 22 located directly under the first cutout portion 222.

The optical connector 20 includes a second cutout portion 224 formed by cutting out an outer surface of the second base 22 so as to reach a second side surface A2. The second cutout portion 224 has a recessed shape.

The optical connector 20 includes a first lens unit 225 provided at the first side surface A1, which partially defines the first cutout portion 222. The first lens unit 225 includes multiple curved lenses 225a. The number of the lenses 225a included in the first lens unit 225 corresponds to the number of the cores 121 of the optical transmission line 10.

The optical connector 20 includes a second lens unit 226 provided at the second side surface A2, which partially defines the second cutout portion 224 and which is located on a side opposite to the side on which the first side surface A1 is located in a light propagation direction. The second lens unit 226 includes multiple curved lenses 226a. The number of the lenses 226a included in the second lens unit 226 corresponds to the number of the cores 121 of the optical transmission line 10.

Figure 4:
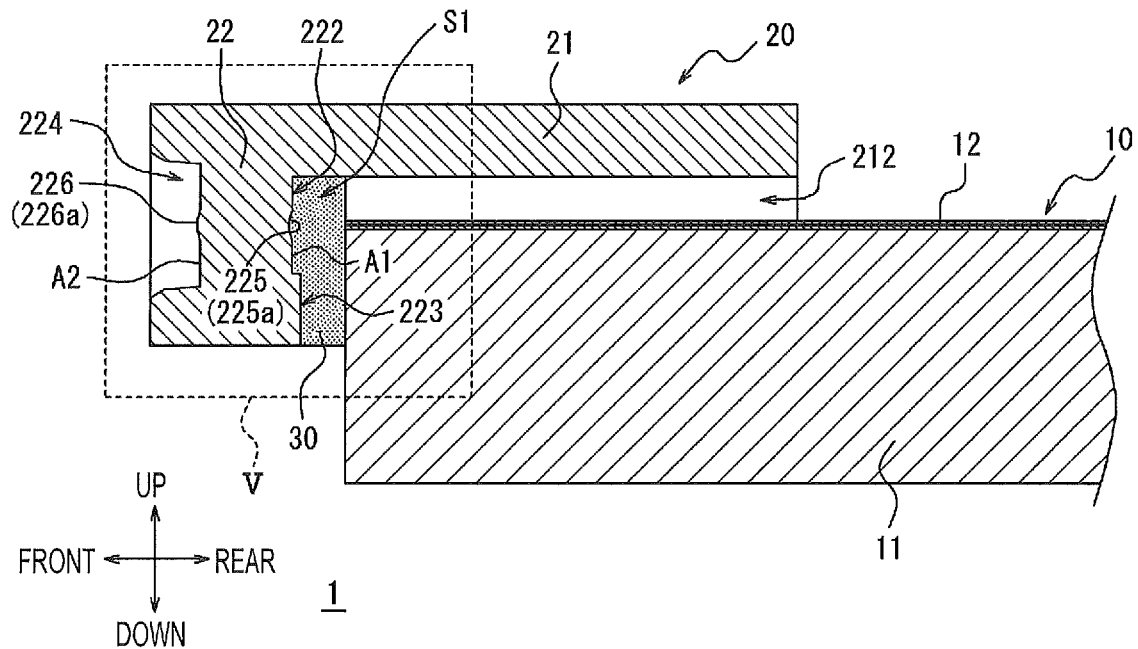
FIG. 4 is a sectional view taken along line IV-IV of FIG. 1.
Figure 5:
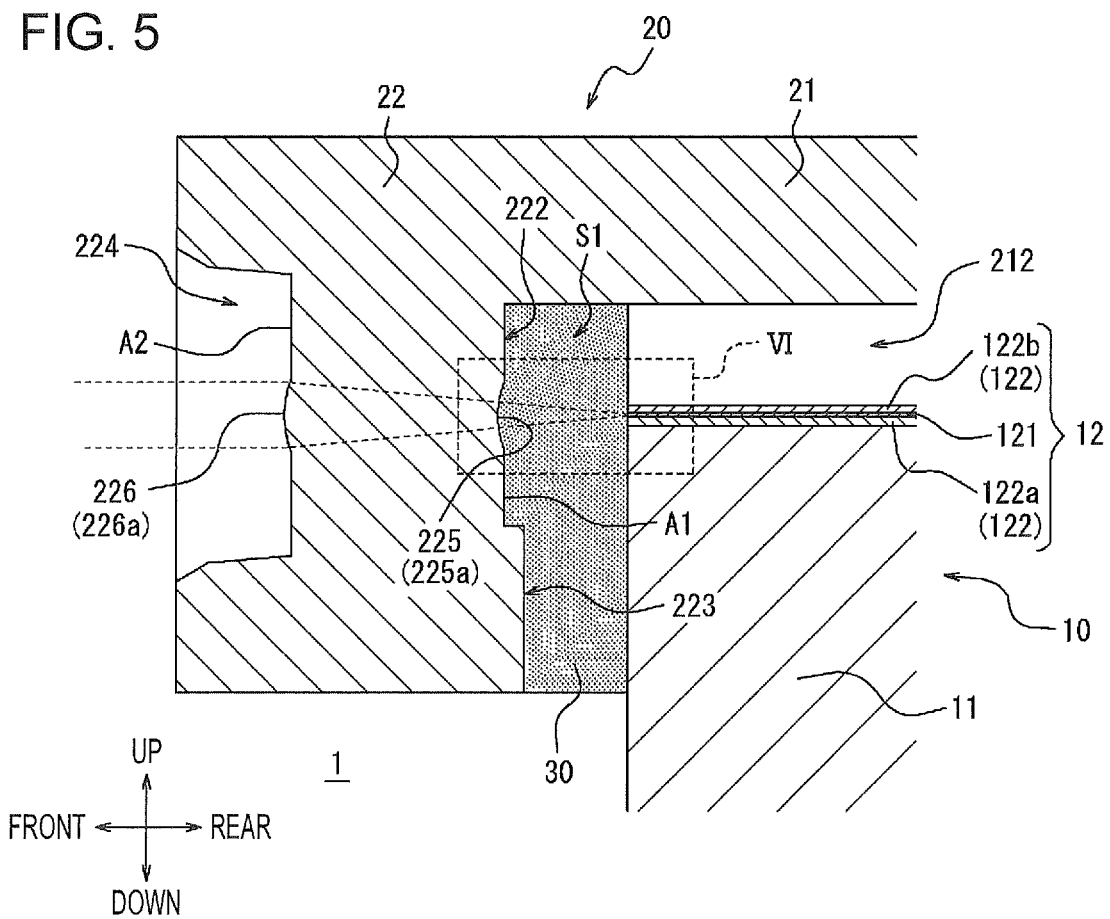
FIG. 5 is an enlarged view of a portion V surrounded by a dashed line in FIG. 4.
Figure 6:
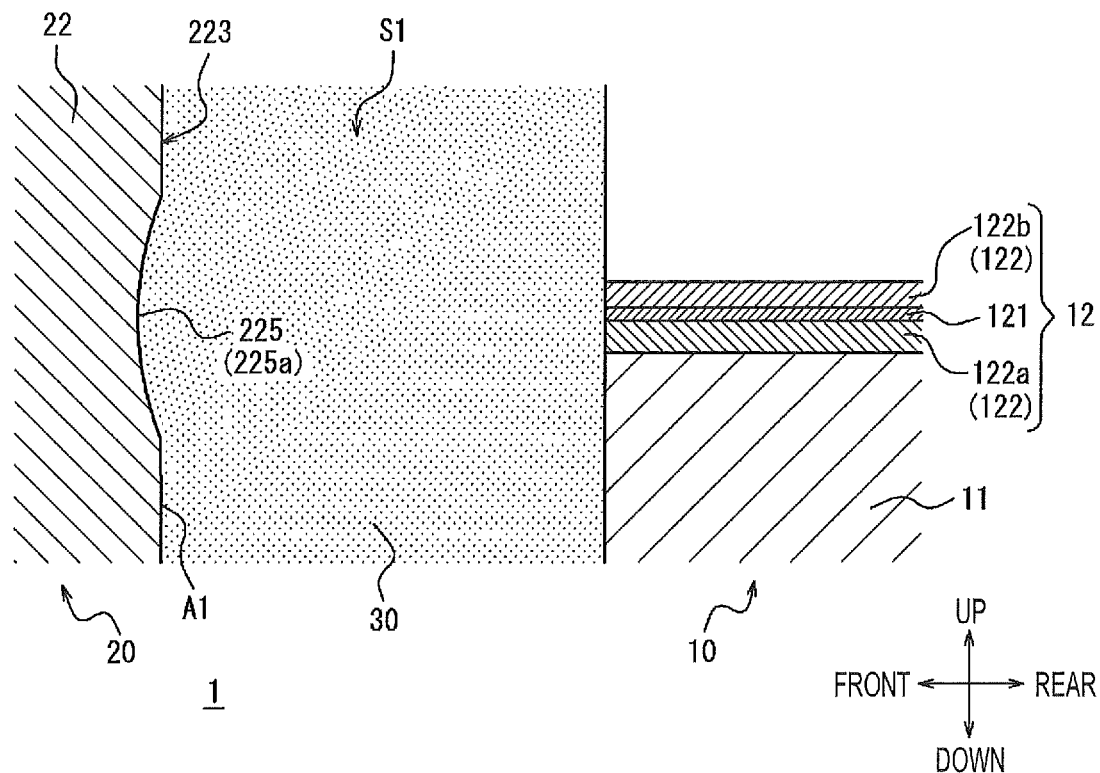
FIG. 6 is an enlarged view of a portion VI surrounded by a dashed line in FIG. 5.

FIG. 4 is a sectional view taken along line IV-IV of FIG. 1. FIG. 5 is an enlarged view of a portion V surrounded by a dashed line in FIG. 4. FIG. 6 is an enlarged view of a portion VI surrounded by a dashed line in FIG. 5. A configuration and a function relating to the adhesive 30 and an optical function of the optical connector 20 will now be mainly described with reference to FIG. 4 to FIG. 6.

As illustrated in FIG. 1, the optical connector 20 is placed on the optical waveguide 12 from above the optical transmission line 10. The optical connector 20 is disposed in such a manner as to cover a portion of the optical transmission line 10 by bringing the first base 21 into contact with the upper surface of the optical waveguide 12. The second base 22 is disposed in such a manner as to project forward from an end portion of the base body 11 and to project downward from the first base 21. The second base 22 projects downward such that the bottom surface thereof is positioned below the position of the optical waveguide 12 in the vertical direction. The second base 22 faces a front surface of the optical transmission line 10, that is, an end surface of the optical transmission line 10 perpendicular to the top surface of the optical transmission line 10.

In this case, as illustrated in FIG. 4, the first space S1 is formed between the optical transmission line 10 and the optical connector 20. The inner surface of the second base 22 of the optical connector 20 in which the first cutout portion 222 is formed is spaced apart from the end surface of the base body 11.

In the third step of the above-described mounting method, the adhesive 30 in injected from below so as to fill the first space S1. The adhesive 30 is made of a material having a refractive index that approximates the refractive index of each of the cores 121 of the optical transmission line 10. The adhesive 30 is interposed between the end surface of the optical transmission line 10 and the first side surface A1 and adjusts the refractive index on an optical path between the cores 121 and the first side surface A1. In this case, the adhesive 30 adheres to the second bonding portion 223 of the optical connector 20. Similarly, the adhesive 30 adheres to the end surface of the optical transmission line 10. The adhesive 30 is in close contact with the second bonding portion 223 and the end surface of the optical transmission line 10 in a state where the adhesive 30 is injected in the first lens unit 225 and the first cutout portion 222. In the manner described above, the optical connector 20 is fixed to the optical transmission line 10 with the adhesive 30.

The optical connector 20 is optically coupled to the optical waveguide 12 included in the optical transmission line 10 in a state where the optical connector 20 is fixed to the optical transmission line 10. As illustrated in FIG. 5, the first side surface A1 faces end surfaces of the cores 121. Similarly, the first lens unit 225 faces the end surfaces of the cores 121. The adhesive 30 is interposed between the first lens unit 225 and the end surfaces of the cores 121.

As an example, the lenses 225a included in the first lens unit 225 are each formed in the first side surface A1 so as to have a concave shape. Each of the lenses 225a is formed as a concave lens. Each of the lenses 225a is formed so as to have an arc shape in a cross-sectional view, such as that illustrated in FIG. 6, along the light propagation direction, that is, the longitudinal direction. The half-width (the radius) of each of the lenses 225a in the vertical direction is larger than the radius of each of the cores 121 of the optical transmission line 10.

In contrast, as illustrated in FIG. 5, the second lens unit 226 faces the first lens unit 225 with the second base 22 of the optical connector 20 interposed therebetween. As an example, the lenses 226a included in the second lens unit 226 are each formed in the second side surface A2 so as to have a convex shape. Each of the lenses 226a is formed as a convex lens. Each of the lenses 226a is formed so as to have an arc shape in a cross-sectional view, such as that illustrated in FIG. 5, along the light propagation direction, that is, the longitudinal direction. The half-width (the radius) of each of the lenses 226a in the vertical direction is larger than the radius of each of the cores 121 of the optical transmission line 10.

As an example, how light propagates when the light is emitted from the end surface of the optical transmission line 10 will now be described with reference to FIG. 5. The following description is based on the premise that the optical transmission line 10 transmits light from a light emitting device. The present disclosure is not limited to this case, and the optical transmission line 10 may transmit light to a light receiving device. In this case, it is to be understood that the following description holds true with a light propagation direction that is opposite to the above-mentioned light propagation direction.

In the case where the adhesive 30 is made of a material having a refractive index that approximates the refractive index of each of the cores 121, the Fresnel reflection of light that is incident on an interface between the adhesive 30 and the cores 121 is reduced by refractive index matching. Thus, the light that is incident on the interface is emitted into the adhesive 30 with a high transmittance.

Light emitted from the cores 121 is incident on the lenses 225a while being caused to spread out by diffraction effect in the adhesive 30. In the case where the optical connector 20 is made of a material having a refractive index that approximates the refractive index of the adhesive 30, the Fresnel reflection of light that is incident on an interface between the optical connector 20 and the adhesive 30 is reduced by refractive index matching. Thus, the light that is incident on the interface is emitted to the optical connector 20, that is, for example, into the second base 22, with a high transmittance.

In the case where each of the lenses 225a is formed as a concave lens, the light emitted into the second base 22 is incident on the lenses 226a while further spreading out. In the case where each of the lenses 226a is formed as a convex lens, light that is incident on an interface between the outside and the optical connector 20 is collimated by, for example, the lenses 226a. In this manner, for example, the optical connector module 1 collimates light emitted from the optical transmission line 10 and propagates the collimated light to the outside.

Light emitted from the optical connector module 1 couples to another optical transmission line. For example, the light couples to the optical fiber held by the ferrule, which is connected to the optical connector 20. For example, the light couples to an optical waveguide to which another optical connector connected to the optical connector 20 is attached.

FIG. 6 illustrates the end surface of the optical transmission line 10 illustrated in FIG. 1. As illustrated in FIG. 6, the end surface of the optical waveguide 12 is flush with the end surface of the base body 11. The end surfaces of the cores 121 and the end surface of the cladding 122 are formed on the same plane along the end surface of the base body 11. However, the present disclosure is not limited to this case, the end surface of the optical waveguide 12, that is, for example, the end surfaces of the cores 121, may be curved surfaces protruding toward the optical connector 20. For example, the end surfaces of the cores 121 may be curved surface protruding further toward the optical connector 20 than the end surface of the cladding 122.

Figure 7:
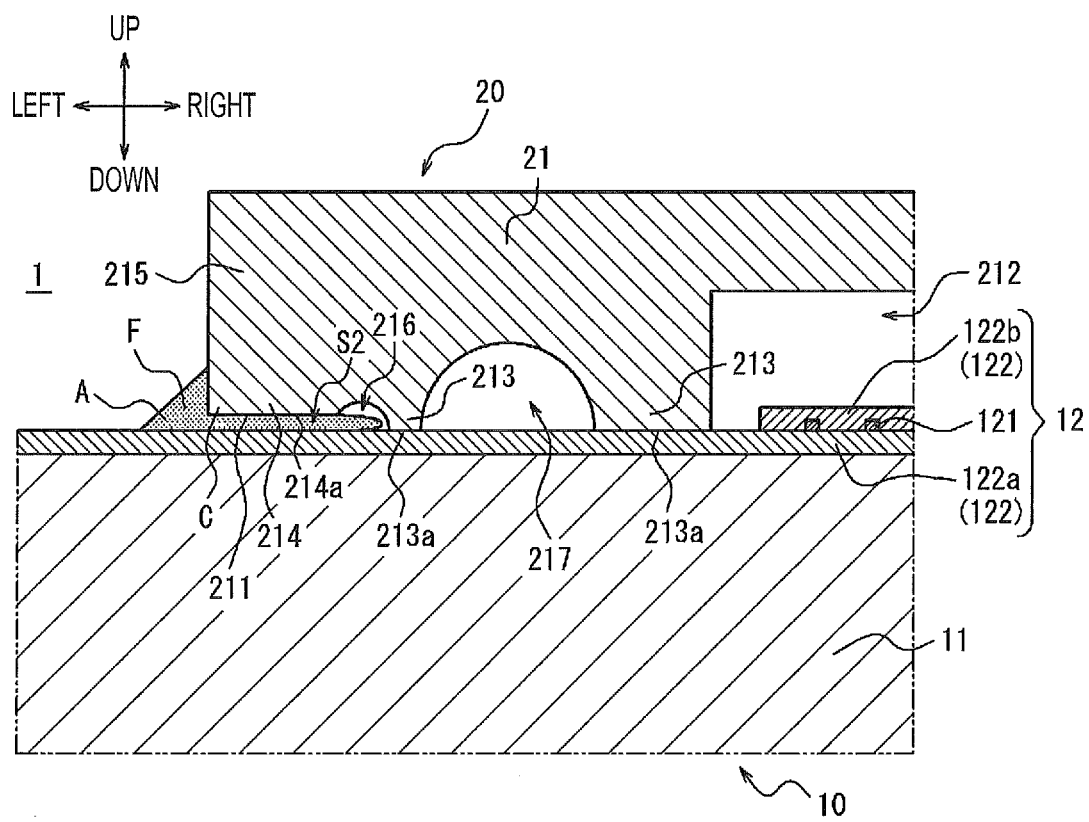
FIG. 7 is a diagram schematically illustrating a cross section of the optical connector module illustrated in FIG. 1 when viewed from the front.

FIG. 7 is a diagram schematically illustrating a cross section of the optical connector module 1 illustrated in FIG. 1 when viewed from the front. A configuration and a function of the optical connector 20 relating to the optical transmission line 10 will now be mainly described with reference to FIG. 7.

In the first step of the above-described mounting method, the optical connector 20 is placed on the optical waveguide 12 from above the optical transmission line 10, and accordingly, the first base 21 is placed on the optical transmission line 10. For example, the contact portions 213 included in the first base 21 are bring into contact with a placement surface of the optical transmission line 10. For example, the contact surfaces 213a, each of which is formed as an end surface of the first base 21, are brought into contact with the top surface of the first cladding 122a of the optical waveguide 12.

In the manner described above, the position of the optical connector 20 with respect to the optical transmission line 10 in the vertical direction is determined on the basis of the contact between the contact surfaces 213a of the first base 21 and the top surface of the first cladding 122a of the optical waveguide 12.

In addition, in the first step of the above-described mounting method, the optical connector 20 may be positioned with respect to the optical transmission line 10 in the longitudinal direction and the transverse direction by a suitable method. Far example, the optical connector 20 may be positioned in the longitudinal direction and the transverse direction by engaging each of the positioning portions 217 with a stud pin formed on the first cladding 122a.

The first bonding portions 214 are spaced apart from the front surface of the optical transmission line 10. For example, the bonding surfaces 214a which are located further toward the inner side of the first base 21 than the contact surfaces 213a are spaced apart from the top surface of the first cladding 122a of the optical waveguide 12. In this case, second spaces S2 are formed between the first bonding portions 214 and the front surface of the optical transmission line 10, and the agent A attaching the optical connector 20 to the optical transmission line 10 is provided in the second spaces S2. Each of the second spaces S2 is surrounded by the front surface of the optical transmission line 10, one of the bonding surfaces 214a, and a corresponding one of the contact portions 213. More specifically, each of the second spaces S2 is surrounded by the top surface of the first cladding 122a, the corresponding bonding surface 214a, and an outer wall of the corresponding contact portion 213 in the transverse direction.

In the second step of the above-described mounting method, the agent A is injected into the second spaces S2 formed between the optical connector 20 and the optical transmission line 10 from the left and right sides of the optical connector 20. In this case, the agent A forms a fillet F in the vicinity of a corner C of each of the side walls 215 of the optical connector 20. Even if the amount of the agent A is excessive, the surplus agent A is accommodated in the relief concave portions 216.

In the manner described above, in the second step of applying the agent A, the optical connector 20 is fixed to the optical transmission line 10 by the agent A. In this case, the agent A adheres to the bonding surfaces 214a of the optical connector 20. Similarly, the agent A adheres to the top surface of the first cladding 122a of the optical transmission line 10.

According to the optical connector 20 of the above-described embodiment, the optical transmission line 10 and the optical connector 20 are reliably fixed to each other, and thus, displacement of the optical connector 20 with respect to the optical transmission line 10 is reduced, and a desired optical property can be maintained. For example, by forming the second spaces S2, in which the agent A is interposed between the first bonding portions 214 and the front surface of the optical transmission line 10, the optical connector 20 can be fixed to the optical transmission line 10 in the second step of the mounting method. In this case, the optical connector 20 can be fixed to the optical transmission line 10 by the agent A while the contact between the contact surfaces 213a of the optical connector 20 and the placement surface of the optical transmission line 10 is maintained.

The agent A will not flow toward the recess 212 beyond the contact surfaces 213a, which are in contact with the first cladding 122a. Thus, a highly accurate positioning function can be maintained while preventing the agent A from flowing into the positioning portions 217. The contact portions 213 are arranged at the left and right ends of the recess 212, so that the positioning of the optical connector 20 with respect to the optical transmission line 10 in the vertical direction is stably performed in the second step of fixing the optical connector 20 to the optical transmission line 10 by using the agent A. The contact portions 213 reduce the probability that the agent A will flow into the positioning portions 217 and also reduces the probability that the adhesive 30 will flow into the positioning portions 217 in the third step of injecting the adhesive 30. Thus, the positioning of the optical connector 20 with respect to the optical transmission line 10 is further stably performed.

Thus, in the subsequent third step, even when the adhesive 30 is injected into the first space S1 formed between the optical transmission line 10 and the optical connector 20, the contact between the contact surfaces 213a and the placement surface of the optical transmission line 10 is reliably maintained. The probability that the adhesive 30 will enter contact portions between the contact surfaces 213a and the placement surface of the optical transmission line 10 is reduced. Consequently, the probability that the adhesive 30 will enter the areas between the optical connector 20 and the optical transmission line 10, the areas being originally designed such that the adhesive 30 does not flow into the areas, is reduced. In the manner described above, displacement of the optical connector 20 with respect to the optical transmission line 10 is reduced, and the optical connector 20 is maintained at its originally designed position. As a result, the optical connector 20 attached to the optical transmission line 10 can maintain a desired optical property.

The contact portions 213 have the contact surfaces 213a, each of which is formed at the most protruding position in the first base 21 toward the optical transmission line 10, so that the positioning of the optical connector 20 with respect to the optical transmission line 10 in the vertical direction is easily and stably performed. In addition, the contact surfaces 213a are in contact with the top surface of the first cladding 122a, so that the contact surfaces 213a can be in contact with the smoothest surface of the optical transmission line 10. This enables the optical connector 20 to be positioned with respect to the optical transmission line 10 in the vertical direction with higher accuracy.

In the first base 21, the first bonding portions 214 have the bonding surfaces 214a, each of which is located on the side opposite to the side on which the optical transmission line 10 is disposed with respect to the corresponding contact surface 213a, so that the second space S2 can be formed without processing the front surface of the optical transmission line 10. For example, a step is formed between each of the contact surfaces 213a and the corresponding bonding surface 214a along the vertical direction, and thus, the second spaces S2, in which the agent A is provided so as to be interposed between the first bonding portions 214 and the front surface of the optical transmission line 10, can be easily formed.

Each of the second spaces S2 is surrounded by the front surface of the optical transmission line 10, the corresponding bonding surface 214a, and the corresponding contact portion 213, so that the second spaces S2 can be easily filled with the agent A. Accordingly, the agent A adheres to the bonding surfaces 214a of the optical connector 20 with certainty. Similarly, the agent A adheres to the front surface of the optical transmission line 10 with certainty. As a result, the optical connector 20 can be reliably fixed to the optical transmission line 10.

The area of each of the bonding surfaces 214*a* is larger than the area of each of the contact surfaces 213*a*, so that the strength with which the optical connector 20 is fixed to the optical transmission line 10 increases. Thus, the probability that the adhesive 30 will enter the contact portions between the contact surfaces 213*a* and the placement surface of the optical transmission line 10 is more effectively reduced. Consequently, displacement of the optical connector 20 with respect to the optical transmission line 10 is more effectively reduced, and the optical connector 20 is maintained at its originally designed position with certainty. As a result, the optical connector 20 attached to the optical transmission line 10 can more easily maintain a desired optical property.

The side walls 215 forming the side end portions of the first base 21 include the first bonding portions 214, so that the agent A can be easily provided in the second spaces S2 in the second step of the mounting method. Fixation of the optical connector 20 to the optical transmission line 10 can be easily achieved by a simple work of applying the agent A from outside of the side walls 215. Therefore, displacement of the optical connector 20 with respect to the optical transmission line 10 is easily reduced, and a desired optical property can be easily maintained.

The optical connector 20 includes the positioning portions 217, so that positioning of the optical connector 20 with respect to the optical transmission line 10 in the longitudinal direction and the transverse direction can be performed. Positioning in the vertical direction can be performed by bringing the contact surfaces 213*a* into contact with the placement surface of the optical transmission line 10, and in addition, positioning in the longitudinal direction and the transverse direction can be performed by using the positioning portions 217, so that the optical connector 20 can be positioned with respect to the optical transmission line 10 with higher accuracy.

The side walls 215 project toward opposite sides in the transverse direction such that one of the side walls 215 is located on the left side of the second base 22 and that the other side wall 215 is located on the right side of the second base 22, so that, for example, when injection molding is performed, the optical connector 20 can be pushed by an ejector pin at a position spaced apart from the contact portions 213 for which high accuracy is required in terms of design. In this manner, the optical connector 20 is pushed by an ejector pin at a position spaced apart from the contact portions 213. Thus, the probability of occurrence of problems concerning the contact portions 213 such as burrs and warpage is reduced.

The side walls 215 project toward opposite sides in the transverse direction such that one of the side walls 215 is located on the left side of the second base 22 and that the other side wall 215 is located on the right side of the second base 22, so that, for example, when the optical connector 20 is attached to the optical transmission line 10, a manufacturing machine or the like can easily hold the side walls 215 of the optical connector 20 by using its arm or the like. In this case, the side walls 215 that are portions to be held by the arm or the like are spaced apart from the contact portions 213, and thus, the probability that the arm or the like will come into contact with the contact portions 213 for which high accuracy is required in terms of design is reduced. Therefore, the probability of occurrence of a problem such as deformation of the contact portions 213 due to such contact is reduced.

The optical connector module 1 can reduce a coupling loss by interposing the adhesive 30 between the first bonding portions 214 and the front surface of the optical transmission line 10. The optical connector module 1 can reduce a loss due to the diffraction effect, a loss associated with scattering or absorption of light by a foreign substance from the outside, a loss due to the Fresnel reflection, and the like.

More specifically, the adhesive 30 having a refractive index that approximates the refractive index of each of the cores 121, is placed in the optical path, so that, the optical connector module 1 can reduce the degree of spread of light due to the diffraction effect compared with light in the air. As a result, the optical connector module 1 can reduce the percentage of light that does not couple to the first lens unit 225 due to the diffraction effect.

The adhesive 30 also serves to reduce entry of a foreign substance. By filling the first space S1 with the adhesive 30, the optical connector module 1 can reduce entry of a foreign substance from the outside. As a result, the optical connector module 1 reduces a loss associated with scattering or absorption of light by a foreign substance from the outside, so that a coupling loss can be reduced.

Since the refractive index of the adhesive 30 approximates the refractive index of each of the cores 121, the optical connector module 1 can reduce the Fresnel reflection at the boundary between the adhesive 30 and the cores 121. The optical connector module 1 causes light to be emitted from the cores 121 with a high transmittance so as to improve coupling efficiency.

The optical connector module 1 includes the curved second lens unit 226, so that an optical adjustment with two lens units can be performed by combining the second lens unit 226 and the first lens unit 225. The optical connector module 1 can improve the degree of freedom regarding an optical adjustment by using the two lens units. As a result, the optical connector module 1 can easily provide emitted light in a desired beam state.

The first lens unit 225 is formed as a concave lens, so that the optical connector module 1 can forcibly cause light emitted from the cores 121 to spread out. The concave lenses are provided at positions in the first side surface A1, the positions facing the cores 121, so that the optical connector module 1 can forcibly cause light that is reduced by the adhesive 30 from spreading out to spread out at an early stage after emission.

The second lens unit 226 is formed as a convex lens, so that the optical connector module 1 can convert light that is caused to spread out by the first lens unit 225, which is a concave lens, into collimated light. The optical connector module 1 can provide a large-diameter collimated light beam by using a combination of a concave lens, which is the first lens unit 225, and a convex lens, which is the second lens unit 226. As a result, the optical connector module 1 can provide collimated light that can be efficiently focused to a smaller spot. The optical connector module 1 can radiate collimated light having a favorable property.

The optical connector module 1 can increase the tolerance of optical coupling by using a large-diameter collimated light beam. In other words, the optical connector module 1 can perform optical coupling within a predetermined tolerance even if the optical axis of the optical connector module 1 and the optical axis of another optical transmission line, which is an optical coupling target, are misaligned.

The optical transmission line 10 and the optical connector 20 are fixed to each other with the adhesive 30, so that the optical connector module 1 can reduce optical axis displacement due to long-term use, its deterioration over time, or the like. Thus, the optical connector modules 1 can maintain the same optical property for a long period of time in a state where the relative positions of the optical transmission line 10 and the optical connector 20 have been determined by initial positioning. In the manner described above, the optical connector module 1 can have improved product quality.

Similar to the adhesive 30, the optical connector 20 is also made of a material having a refractive index that approximates the refractive index of each of the cores 121, so that the optical connector module 1 can reduce the Fresnel reflection and reduce a coupling loss.

It is obvious to those skilled in the art that the present disclosure can be embodied in other specific forms other than the above-described embodiment without departing from the spirit or the essential characteristics thereof. Thus, the above description is an example, and the present disclosure is not limited to the above description. The scope of the present disclosure is defined not by the above description but by the claims. Among all possible changes, some changes that are within a range equivalent to the scope of the present disclosure are within the scope of the present disclosure.

For example, the shapes, the arrangements, the orientations, and the numbers of the above-described components are not limited to those described above or those illustrated in the drawings. The shapes, the arrangements, the orientations, and the numbers of the components may be arbitrarily set as long as the functions of the components can be obtained.

In the above-described embodiment, although the contact portions 213 include the contact surfaces 213a, the present disclosure is not limited to this configuration. Each of the contact portions 213 may include, for example, one or more protrusions instead of the contact surface 213a. In this case, positioning of the optical connector 20 with respect to the optical transmission line 10 in the vertical direction may be performed by bringing such protrusions into contact with the placement surface of the optical transmission line 10.

Figure 8:
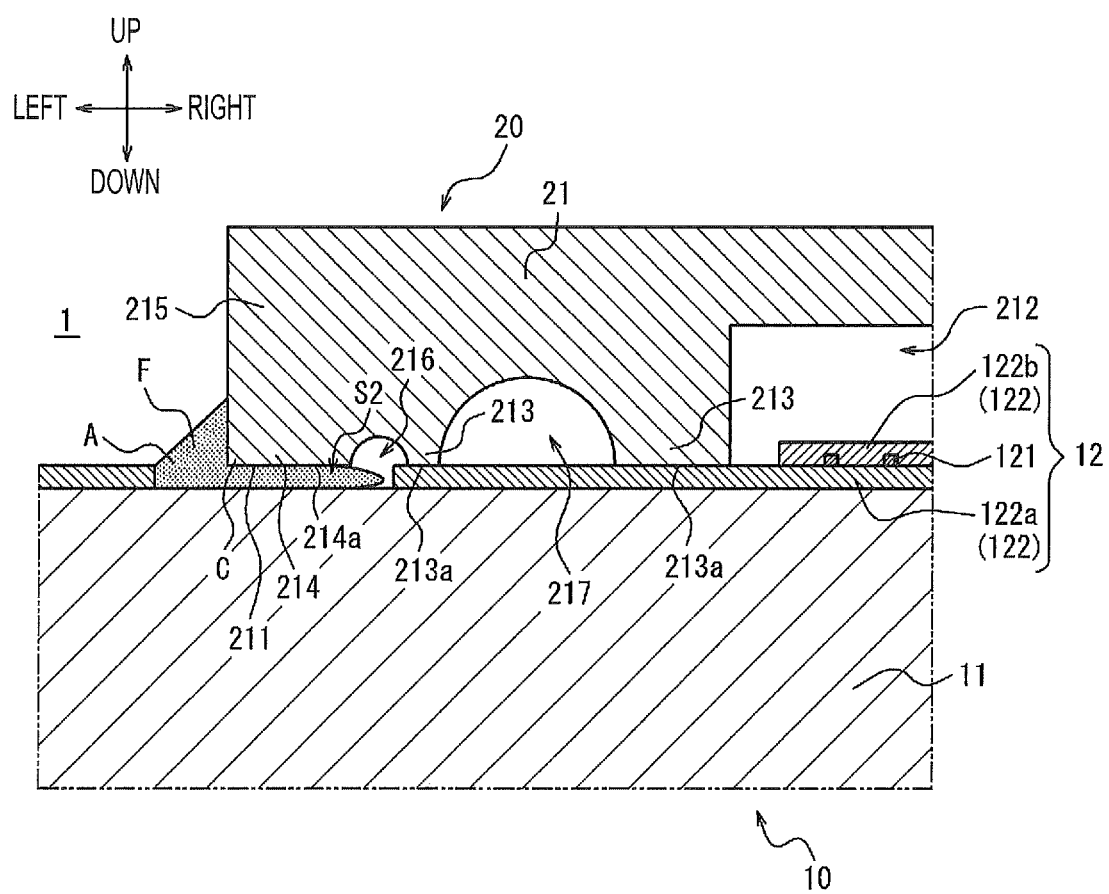
FIG. 8 is a diagram corresponding to FIG. 7 and schematically illustrating a variation of the optical connector module illustrated in FIG. 1.

FIG. 8 is a diagram corresponding to FIG. 7 and schematically illustrating a variation of the optical connector module 1 illustrated in FIG. 1. In the above-described embodiment, although the bonding surfaces 214a are located further toward the inner side of the first base 21 than the contact surfaces 213a, and each of the first bonding portions 214 is separated from the corresponding contact portion 213 by the step is formed therebetween, the present disclosure is not limited to this configuration. For example, as illustrated in FIG. 8, the bonding surfaces 214a of the first bonding portions 214 and the contact surfaces 213a may be located on the same plane in the first base 21.

In this case, for example, the second spaces S2, in which the agent A is provided so as to be interposed between the first bonding portions 214 and the front surface of the optical transmission line 10, may be formed by cutting out a portion of the first cladding 122a. For example, each of the second spaces S2 may be surrounded by the top surface of the base body 11 of the optical transmission line 10, the corresponding bonding surface 214a, and the first cladding 122a.

In FIG. 8, the relief concave portions 216 each separate one of the contact surfaces 213a and the corresponding bonding surface 214a from each other in the first base 21. Separation of the first bonding portions 214 and the respective contact portions 213 may be achieved by the relief concave portions 216 instead of the steps.

According to the variation of the optical connector module 1 illustrated in FIG. 8, the contact surfaces 213a and the bonding surfaces 214a are formed so as to be located on the same plane, so that the shape of the optical connector 20 can be simplified. Even if the optical connector 20 has such a simple shape, the second spaces S2 can be formed, and the above-mentioned advantageous effects of reducing displacement of the optical connector 20 with respect to the optical transmission line 10 and maintaining a desired optical property are obtained as in the above-described embodiment.

In addition, the contact surfaces 213a and the respective bonding surfaces 214a are separated from each other by the relief concave portions 216, so that, even if the amount of the agent A is excessive, the surplus agent A is accommodated in the relief concave portions 216. Consequently, the probability that the agent A will enter the contact portions between the contact surfaces 213a and the placement surface of the optical transmission line 10 is reduced. Thus, displacement of the optical connector 20 with respect to the optical transmission line 10 is reduced, and the optical connector 20 is maintained at its originally designed position with certainty. As a result, the optical connector 20 attached to the optical transmission line 10 can maintain a desired optical property.

In the above-described embodiment, although the optical connector 20 includes the relief concave portions 216, the present disclosure is not limited to this configuration. Both the optical connector 20 illustrated in FIG. 7 and the optical connector 20 illustrated in FIG. 8 do not necessarily include the relief concave portions 216 as long as the agent A that is used for fixing the optical connector 20 to the optical transmission line 10 is maintained at an appropriate amount.

In the above-described embodiment, although the area of each of the bonding surfaces 214a is larger than the area of each of the contact surfaces 213a, the present disclosure is not limited to this configuration. The area of each of the bonding surfaces 214a may be equal to or smaller than the area of each of the contact surfaces 213a as long as strength necessary to fix the optical connector 20 to the optical transmission line 10 is maintained.

In the above-described embodiment, although the first bonding portions 214 are included in the side walls 215, the present disclosure is not limited to this configuration. Each of the first bonding portions 214 may be formed at any position in the optical connector 20 as long as it can implement a required function.

In the above-described embodiment, although the optical connector 20 includes the positioning portions 217, each of which is formed in a recessed manner in the first base 21, the present disclosure is not limited to this configuration. For example, the optical connector 20 may include a protruding portion that is fitted into a recess formed in the optical transmission line 10. In this case, the optical connector 20 may be positioned in the longitudinal direction, the transverse direction, and the vertical direction by fitting the protruding portion into the recess.

In the above-described embodiment, although the optical connector 20 is positioned with respect to the optical transmission line 10 by using the positioning portions 217, the present disclosure is not limited to this configuration. For example, the optical connector 20 may be positioned by bringing at least one of inner side surfaces of the recess 212, the inner side surfaces extending in the longitudinal direction, into contact with the left and right end surfaces of the optical waveguide 12 projecting from the base body 11.

In the above-described embodiment, although the side walls 215 of the optical connector 20 are continuously formed in a flat plate-like shape, the present disclosure is not limited to this configuration. The side walls 215 are not necessarily be continuous and may be formed in such a manner as to be divided, by one or more slits, into any number of portions having any shape and any height in any arrangement. This increases the bonding area between the agent A and each of the first bonding portions 214, and thus, the optical connector 20 is fixed to the optical transmission line 10 with higher strength.

In the above-described embodiment, although the bonding surfaces 214a forming the bottom surfaces of the side walls 215 are flat surfaces, the present disclosure is not limited to this configuration. For example, each of the bonding surfaces 214a may be a surface having any shape, examples of which include a curved surface and an inclined surface. For example, any number of recesses or through holes having any shape and any height may be formed in the bonding surfaces 214a in any arrangement toward the side opposite to the side on which the optical transmission line 10 is disposed. By forming such recesses or through holes in the bonding surfaces 214a, even if the amount of the agent A is excessive, the surplus agent A can be accommodated in the recesses or the through holes. As described above, in order to optimize the bonding manner of the agent A in the second spaces S2, the shape of each of the bonding surfaces 214a, the number of recesses or through holes, the shape and the height of the recesses or the through holes, the arrangement of the recesses or the through holes, and so forth may be suitably set.

In the above-described embodiment, although the corner C of each of the side walls 215 of the optical connector 20 is a right angle, the present disclosure is not limited to this configuration. For example, a surface having any shape, examples of which include a chamfered surface and a rounded surface, may be formed at the corner C of each of the side walls 215.

In the above-described embodiment, although the optical waveguide 12 is formed on the top surface of the base body 11, the present disclosure is not limited to this configuration. For example, the optical waveguide 12 may be embedded in the base body 11. In this case, the end surface of the optical waveguide 12 may be flush with the end surface of the base body 11, and the end surfaces of the cores 121 may be exposed at the base body 11.

In the above-described embodiment, although only the first space S1 is filled with the adhesive 30, the present disclosure is not limited to this configuration. For example, the adhesive 30 may be injected so as to fill the recess 212 of the optical connector 20, the recess 212 covering the optical transmission line 10, in addition to the first space S1.

In the above-described embodiment, although the contact portions 213 and the contact surfaces 213a extend over substantially the entire first base 21 in the longitudinal direction, the present disclosure is not limited to this configuration. The number of the contact portions 213 and the number of the contact surfaces 213a may each be any number, and the contact portions 213 and the contact surfaces 213a may be formed to have any shapes in any arrangement and may be oriented in any directions as long as their functions can be obtained. For example, the contact portions 213 and the contact surfaces 213a may each extend in the longitudinal direction in a portion of the first base 21. The same and/or similar applies to the first bonding portions 214, the side walls 215, the relief concave portions 216, and the positioning portions 217.

In the above-described embodiment, although the contact surfaces 213a are in contact with the top surface of the first cladding 122a, the present disclosure is not limited to this configuration. The contact surfaces 213a may be in contact with any surface of the optical transmission line 10. For example, the contact surfaces 213a may be in contact with the top surface of the base body 11 or may be in contact with the top surface of the second cladding 122b.

In the above-described embodiment, although the first lens unit 225 and the second lens unit 226 each have an arc shape in cross section, the present disclosure is not limited to this configuration. The shape of the first lens unit 225 and the shape of the second lens unit 226 may each be a spherical surface or may be an aspherical surface.

In the above-described embodiment, although the first lens unit 225 is a concave lens, the present disclosure is not limited to this configuration. The first lens unit 225 may be any type of lens such as a convex lens as long as a desired optical property can be obtained.

The optical connector 20 does not necessarily include the second lens unit 226 as long as a desired optical property can be obtained. The second lens unit 226 is not limited to being a convex lens and may be any type of lens such as a concave lens.

REFERENCE SIGNS 1 optical connector module
10 optical transmission line
11 base body
12 optical waveguide
121 core
122 cladding
122a first cladding
122b second cladding
20 optical connector
21 first base
211 bottom surface
212 recess
213 contact portion
213a contact surface
214 first bonding portion (bonding portion)
214a bonding surface
215 side wall
216 relief concave portion
217 positioning portion
22 second base
221 through hole
222 first cutout portion
223 second bonding portion
224 second cutout portion
225 first lens unit
225a lens
226 second lens unit
226a lens
30 adhesive
A agent
A1 first side surface
A2 second side surface
C corner
F fillet
S1 first space
S2 second space (space)

The invention claimed is:
1. An optical connector attached to an optical transmission line including a base body and an optical waveguide stacked on the base body, the optical connector comprising:
 a first base placed on the optical transmission line;
 a second base formed in such a manner as to be contiguous to the first base;

a side wall forming a portion of the first base and projecting outward with respect to the second base;

a contact portion included in the first base and being in contact with a placement surface of the optical transmission line; and a bonding portion formed in a region of the first base that is different from another region of the first base in which the contact portion is formed, the bonding portion being spaced apart from a front surface of the optical transmission line, wherein the bonding portion is disposed on the side wall outward of the contact portion in the optical connector, and wherein a space is formed between the bonding portion and the front surface of the optical transmission line, the space being for an agent attaching the optical connector to the optical transmission line.

2. The optical connector according to claim 1, wherein the contact portion has a contact surface formed at a most protruding position in the first base toward the optical transmission line.

3. The optical connector according to claim 2, wherein the bonding portion has a bonding surface located on a side opposite to a side on which the optical transmission line is disposed with respect to the contact surface in the first base.

4. The optical connector according to claim 3, wherein the space is surrounded by the front surface of the optical transmission line, the bonding surface, and the contact portion.

5. The optical connector according to claim 2, wherein the bonding portion has a bonding surface located on a same plane as the contact surface in the first base.

6. The optical connector according to claim 1, wherein a relief concave portion is formed in the first base in such a manner as to separate the contact surface and the first bonding surface from each other.

7. The optical connector according to claim 3, wherein the bonding surface has an area larger than an area of the contact surface.

8. The optical connector according to claim 1, wherein the bonding portion is included in the side wall forming a side end portion of the first base.

9. The optical connector according to claim 8, further comprising:

a positioning portion formed in a recessed manner in the first base and sandwiching the contact portion together with the side wall.

10. The optical connector according to claim 1, further comprising:

the second base projecting from the first base in a direction perpendicular to a direction in which the first base extends and facing an end surface of the optical transmission line that is perpendicular to the front surface of the optical transmission line.

11. An optical connector module comprising:

the optical connector according to claim 1;

the optical transmission line including the base body and the optical waveguide stacked on the base body; and the agent attaching the optical connector to the optical transmission line.

12. The optical connector according to claim 5, wherein the bonding surface has an area larger than an area of the contact surface.

13. The optical connector according to claim 2, wherein the bonding portion is included in the side wall forming a side end portion of the first base.

14. The optical connector according to claim 3, wherein the bonding portion is included in the side wall forming a side end portion of the first base.

15. The optical connector according to claim 5, wherein the bonding portion is included in the side wall forming a side end portion of the first base.

16. The optical connector according to claim 2, further comprising:

the second base projecting from the first base in a direction perpendicular to a direction in which the first base extends and facing an end surface of the optical transmission line that is perpendicular to the front surface of the optical transmission line.

17. The optical connector according to claim 3, further comprising:

the second base projecting from the first base in a direction perpendicular to a direction in which the first base extends and facing an end surface of the optical transmission line that is perpendicular to the front surface of the optical transmission line.

18. The optical connector according to claim 5, further comprising:

the second base projecting from the first base in a direction perpendicular to a direction in which the first base extends and facing an end surface of the optical transmission line that is perpendicular to the front surface of the optical transmission line.

* * * * *